United States Patent [19]

Thaler

[11] Patent Number: 5,433,568

[45] Date of Patent: Jul. 18, 1995

[54] WASHER ASSEMBLY COMBINATION FOR USE WITH A NUT AND BOLT, OR THE LIKE

[76] Inventor: Kunibert Thaler, 32/33 Maplewood Drive, RR #1, Parry Sound, Ontario P2A 2W7, Canada

[21] Appl. No.: 165,341

[22] Filed: Dec. 13, 1993

[51] Int. Cl.⁶ .......................... F16B 33/00; F16B 43/02
[52] U.S. Cl. ..................................... 411/369; 411/542; 411/915
[58] Field of Search ................ 411/369, 542, 544, 907, 411/915

[56] References Cited

U.S. PATENT DOCUMENTS

| 759,834 | 5/1904 | Steel . | |
|---|---|---|---|
| 1,208,620 | 12/1916 | Moser . | |
| 1,282,535 | 10/1918 | Bropson . | |
| 2,927,495 | 3/1960 | Barwood | 411/369 X |
| 2,982,573 | 5/1961 | McKee . | |
| 3,153,971 | 10/1964 | Lovisek | 411/369 X |
| 3,452,636 | 7/1969 | Cohen et al. | 411/369 X |
| 3,566,738 | 3/1971 | Cupit | 411/369 |
| 3,606,357 | 9/1971 | Yonkers | 411/542 X |
| 4,621,963 | 11/1986 | Reinwall | 411/369 |
| 4,701,088 | 10/1987 | Crull | 411/542 X |
| 5,203,593 | 4/1993 | Brandener . | |
| 5,237,789 | 8/1993 | Thaler . | |
| 5,338,141 | 8/1994 | Hulsey | 411/369 X |

FOREIGN PATENT DOCUMENTS

| 1211763 | 3/1960 | France | 411/369 |
| 2523685 | 12/1975 | Germany | 411/542 |

OTHER PUBLICATIONS

Ser. No. 08/095,021 Thaler, Jul. 22, 1993.

Primary Examiner—Neill R. Wilson
Attorney, Agent, or Firm—Evenson, McKeown, Edwards & Lenahan

[57] ABSTRACT

A washer assembly combination for use with a threaded fastener which combination includes a rigid cup and a resilient member received within the cup. The resilient member, typically a polymer of ethylene propylene diene monomer, is oversized with respect to the cup interior such that, in use, the member is compressed so as to exert a compressive force on materials held together by the fastener. The assembly is useful for fastening together of sheet metal materials, and particularly, provides a system for sealing against the ingress of water between two layers of material in which such an assembled combination is used in conjunction with a clamping member.

30 Claims, 2 Drawing Sheets

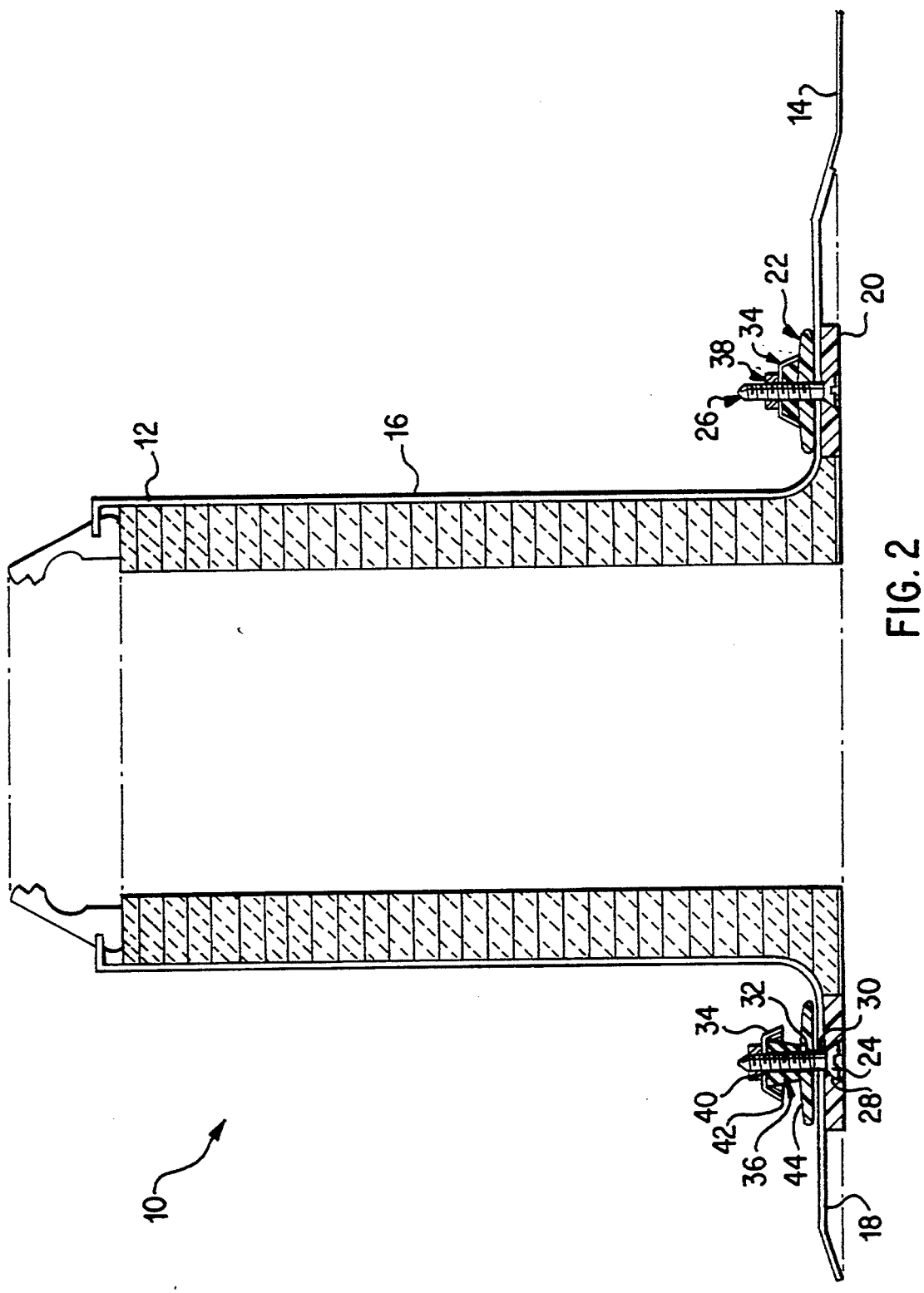

WASHER ASSEMBLY COMBINATION FOR USE WITH A NUT AND BOLT, OR THE LIKE

FIELD OF THE INVENTION

This invention is in the field of fasteners such as threaded bolts and nuts used for the fastening together of sheet metal materials and the like. Particularly, this invention relates to a washer assembly combination for use with a threaded fastener which combination includes a rigid cup and a resilient member received within the cup, the resilient member being oversized with respect to the cup interior such that, in use, the member is compressed so as to exert a compressive force on materials held together by the fastener. More particularly, this invention relates to a system for sealing against the ingress of water between two layers of material in which such an assembled combination is used in conjunction with a clamping member.

BACKGROUND TO THE INVENTION

A nut and bolt combination is a well known fastening device. Generally speaking, a metal washer encircles the bolt shaft and is interposed between the nut and the member against which the nut is tightened. Location of a washer between rotatable and static members is known to promote a fit of the fastened members more resistant to loosening by vibration. The nuts, bolts and washers in common use are often manufactured of metal but modification of this arrangement has been suggested for various purposes over the years.

For example, U.S. Pat. No. 2,982,573 of McKee, Jr. describes a composite sealing washer having an annular sealing portion of neoprene rubber received within a cup-shaped flexible metal member. A washer is used in conjunction with a conventional nut and bolt to fasten two plates together. The sealing portion is oversized such that when the nut is tightened onto the bolt, material of the sealing portion spreads into a gap between the bolt and plates.

U.S. Pat. No. 1,208,620, of Moser, discloses a washer having a gasket received within a countersink in one of its sides. The gasket is said, among other things, to assist in giving a better binding action of the washer against the nut. It is suggested that two such washers be used in conjunction with an ordinary nut and bolt to clamp together two elements. The gaskets are arranged to abut surfaces of the elements. The gasket is of rubber or other resilient material and is oversized so as to be compressed when the arrangement is tightened by rotation of the nut along the bolt.

One longstanding problem with the nut and bolt fastening arrangement sometimes arises when a nut is fastened too tightly onto the bolt. Overtightening can lead to stripping of the threads of one or the other or both of the nut and bolt. Sometimes, the shaft of the bolt is snapped off. Although nuts and bolts are generally considered low-cost items in themselves, it can be very time-consuming to have to replace an awkwardly positioned bolt, or one that is part of a complex arrangement of parts that must be disassembled in order to replace the bolt.

If relatively soft materials are fastened together by squeezing the materials between the nut and bolt, overtightening can sometimes lead to the head of the bolt being "pulled through" the material and to damage of the material.

Threaded fasteners such as nuts and bolts are sometimes used in arrangements in which layered members of material are sandwiched together between the nuts and bolts. Such an arrangement is shown, for example, in U.S. Pat. No. 5,237,789, issued Aug. 24, 1993 and naming the same inventor as this patent application. The previous patent specification, which is incorporated herein by reference, shows a clamp for a roof device in which a roofing membrane is sandwiched between an underlying skirt of a roof device (such as a pipe sleeve) and an overlying clamping ring. The ring, membrane and skirt are sandwiched between the nut and head of a bolt having its shaft passing through registered apertures of the various elements, the fastening nut being rotated down against the upper surface of the clamping ring. An object of such an arrangement is to provide a seal against the passage of water between the membrane and skirt without the use of adhesive.

Such roofing membranes are commonly of sheet materials such as PVC (polyvinyl chloride), EPDM (ethylene propylene diene monomer polymers), Hypolon, neoprene, etc. It has recently been found for certain of these roofing membranes, particularly those lacking "memory", such as PVC, that it is beneficial to interpose an annular sealing gasket between the clamping ring and membrane in order to obtain an improved seal against water ingress.

SUMMARY OF THE INVENTION

In a first aspect, the present invention provides a washer assembly combination for use with a nut and bolt, or the like. The assembly includes a cup having an aperture in its bottom end for assembly onto the threaded shaft of the bolt. There is also a resilient annulus, which in use, is received in the cup.

The annulus has an axial aperture located to register with the aperture of the cup so that the bolt shaft can be inserted through the annulus. The annulus and cup are shaped so that there is a gap between the annulus and an interior wall of the cup, but at the same time, the annulus is sized to extend beyond a rim of the cup when received in the cup. The annulus and cup may thus be assembled onto the free end of the bolt shaft with the annulus in abutment against a member to be fastened between the nut and bolt head. The nut is then threaded onto the bolt to abut an outer side of the bottom end of the cup to sandwich the cup, annulus and member between the nut and bolt head and to compress the annulus against the member and into the gap. The cup is rigid so that only the resilient annulus, which may be of EPDM or other rubber, etc. is deformed as the nut forces the cup toward the member as it travels along the bolt shaft toward the head of the bolt.

The arrangement is such, that when the rim of the cup comes into contact with the member, a pre-determined pressure is exerted by the compressed annulus on the member. In this way, a satisfactory degree of tightening can be obtained with reduced risk of stripping the bolt or otherwise damaging the fastening arrangement during rotation of the nut onto the bolt shaft.

In a second aspect, the present invention is a system for sealing against the ingress of water between first and second layers of material. The system includes the first layer of material, the material being relatively rigid and having a surface for abutting a the second layer of material. The second layer of material is relatively flexible and could be, for example, a layer of PVC.

The system also includes a threaded longitudinal fastening member having a free end extending beyond the surface of the relatively rigid material so that it may be inserted through a hole in the flexible material as the two layers of material are brought into abutment with each other.

The system includes a clamping member for abutment with the assembled second layer. The clamping member also has an aperture for assembly onto the free end of the fastening member.

There is a resilient annular member for receipt within the cavity of a cup. The annular member has an aperture for assembly onto the fastening member with the annular member in abutment against the clamping member. The cup has its cavity open at a first end and there is an aperture in an opposite second end, that is, the bottom end of the cup, for assembly on the free end of the threaded fastening member with the annular member received in the cavity.

The system includes a nut for threading onto the free end of the fastening member.

The uncompressed length of the annular member exceeds the depth of the cavity such that as the nut is rotated to force the cup axially toward the clamping member, the annular member is compressed between the nut and clamping member into the cavity of the cup. Further, the annular member is dimensioned such that when the rim of the cup comes into contact with the clamping member the annular member exerts a predetermined pressure on the clamping member. In this way the first and second layers are compressed together to preclude entry of water between the first and second layers. Further, because of the resilient memory of the annular member, the layers continued to be sealingly pressed together over time even though the second layer may lack such memory, such as in the case of PVC.

There are, of course, more specific aspects of the invention. For instance, the cup can define a cavity in which the diameter of the upper end of the cavity is greater than the diameter of the cavity at the bottom end of the cup. The cavity can be frustoconically shaped, that is, be trapezoidal in axial cross-section.

The annulus can be wider at one axial end than the other, and also be frustoconically shaped.

The annulus can have a first axial end for abutment against the bottom of the cavity in which the maximum diameter of the first axial end is less than or equal to the diameter of the the bottom of the cavity.

The cup can be of rigid metal and/or the annulus can be a polymer of ethylene propylene diene monomer.

The annulus can have a durometer hardness of between about 55 and about 80.

In certain embodiments, such as the one described in detail below, the axial height of the annulus when in an uncompressed state exceeds the average difference between the outer and inner diameters of the annulus.

The first layer of the sealing system can include a skirt of a roof device similar to that described in U.S. Pat. No. 5,237,789, and the clamping member can be a clamping ring.

BRIEF DESCRIPTION OF THE DRAWINGS

FIG. 2 shows a sectional view taken along 2—2 of FIG. 1.

DETAILED DESCRIPTION OF A PREFERRED EMBODIMENT

Figure 1:
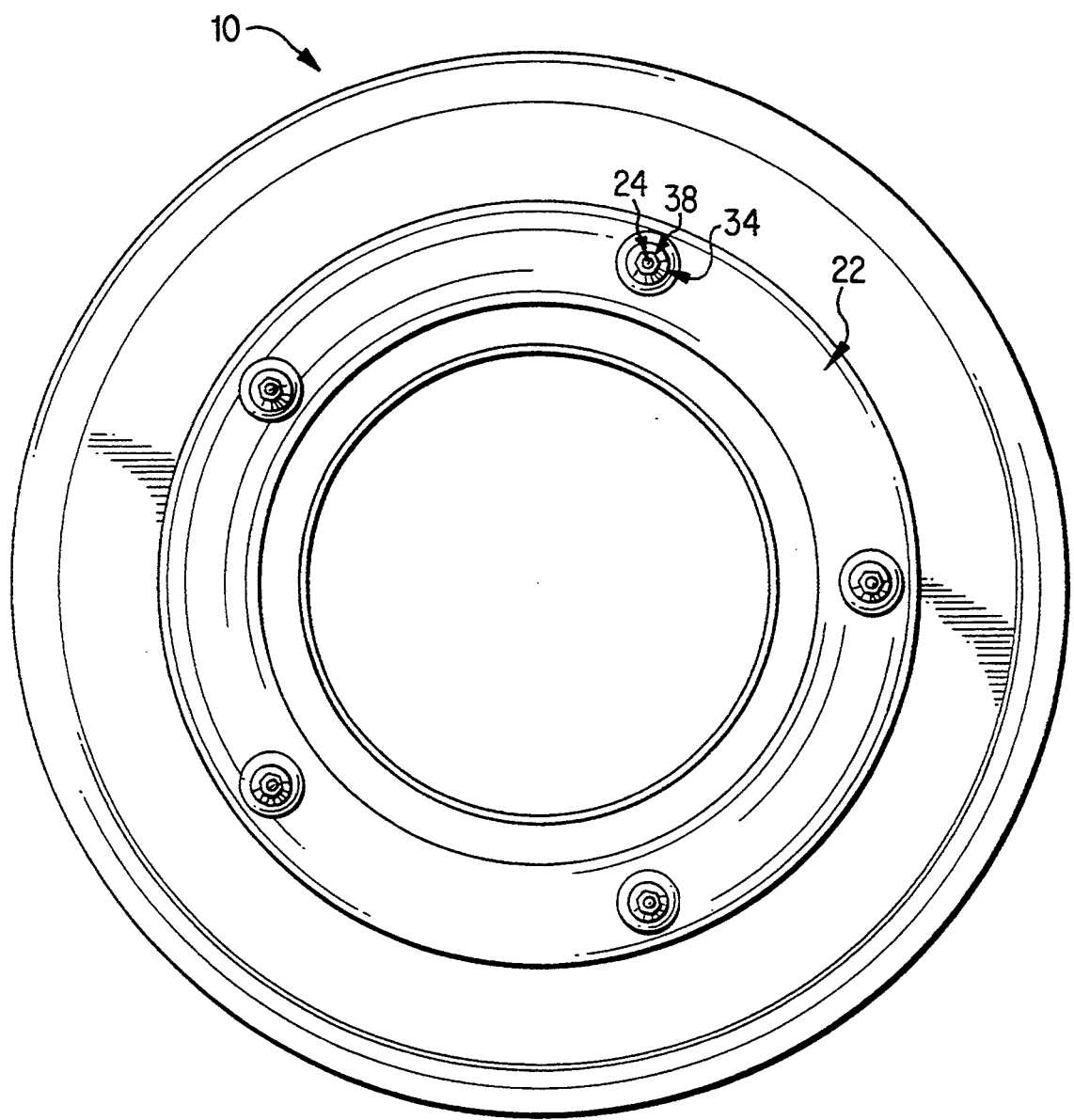
FIG. 1 shows a top plan view of a roof device installation including five fastener assemblies of the preferred embodiment of the present invention.

Turning to the drawings, a roofing installation 10 including pipe sleeve 12 is shown anchored to a roofing membrane 14 (the membrane has been omitted from the left hand side of FIG. 2 for illustrative purposes). Pipe sleeve 12 includes insulated upright cylinder 16, and annular skirt 18 having collar 20 adhered to its underside, the upper surface of the annular skirt and the underside of membrane 14 in direct abutment with each other. ocated above membrane 14 and encircling the cylinder to be generally coextensive with collar 20 is clamping ring 22. Bolt 24 has the free end of threaded shaft 26 received upwardly through registering apertures 28, 30, 32 of the collar, skirt and ring, respectively. The arrangement includes, in association with each bolt 24, rigid inverted cup 34, resilient annulus 36 and fastening nut 38, the annulus having a generally frustoconical cross-section.

Sleeve 12 and pre-installed bolts 24 are thus positioned within an opening of roofing membrane 14 as shown. Clamping ring 22 is slipped onto the bolts followed by placement of an annulus around each threaded bolt shaft, the narrower portion of the frustum being directed downwardly. A cup is positioned with its open end directed downwardly atop each annulus, each cup having a hole 40 for passage of the bolt shaft therethrough. Nut 38 is then threaded onto each shaft and rotated into abutment with the upwardly facing side of the inverted cup. The nut is rotated by means of a wrench or other convenient tool to compress the annulus into the cavity of the cup and until rim 42 of the cup touches the top side 44 of clamping ring 22.

In the illustrated arrangement, a water-tight seal is obtained between the skirt of the pipe sleeve and roofing membrane when all five of the fastener cups have been secured in place with the resilient annuluses received into the cups. The membrane may be of polyvinyl chloride sheeting material of thickness from about 20 to about 62 mils. The polyvinyl chloride sheet is relatively flexible, compared with the skirt of the pipe sleeve, but at the same time the sheet lacks the resilience of a rubber material such as EPDM. The downward pressure exerted by the resilient compressed annulus is distributed around the entire ring-membrane interface. The EPDM may be selected to have a memory sufficient to extend over several years of the installation so as to maintain the water-tight seal.

The frustoconical annulus or toroidal shaped member illustrated is of EPDM having a durometer hardness of about 55. The height of the uncompressed annulus is about 0.6 inches (15 mm) and has a maximum outer (i.e., upper) diameter of about 0.8 inches (20 mm) and a minimum outer (i.e., lower) diameter of about ⅜ inches (9½ mm). The internal depth of the cup is about ⅜ inches (9.5 mm). The diameter of the cup cavity is about 0.8 inches (20 mm) at its base and about 1 inch (2.54 mm) around the rim of the cup. The illustrated bolts have ¼ inch (about 6 mm) shafts and the inner diameter of the resilient annulus is just about equal to or slightly larger than the shaft diameter so as to be easily installed onto a bolt shaft. The height of the annulus could of course be varied to obtain a different compressive force.

The skirt of the roof sleeve has a thickness of about 064 inches (1.4 mm) and the collar has a thickness of about ¼ inches (0.6 mm).

In the illustrated embodiment, there are five fasteners evenly spaced about 7 inches (18 cm) from each other about the ring. Each installed annulus provides a compressive force of about 40 psi, which is sufficient to provide a water-tight seal between the PVC and skirt layers. The compressive sealing pressure provided by the resilient EPDM directed axially along the lengthwise direction of the bolt would be expected to last for a considerable length of time, that is, for a number of years. This is in contrast to the PVC of the sheeting material, which has considerably less resilient "memory".

Variations of the preferred embodiment within the scope of the present invention are possible. While the disclosed embodiment includes a resilient member for use with a threaded member having a ¼ inch (6.4 mm) outer diameter, other arrangements within the scope of this invention would be possible. An annulus and cup dimensioned for use with a threaded fastening shaft as small as ⅛ inch would be possible. Alternatively, an annulus and cup adapted for use with a larger shaft, say ½ inch (1.3 mm), or larger, could be obtained.

It will be appreciated that the compressive force exerted on the members being fastened by the arrangement can be varied. For example, increasing the hardness of the rubber of the annulus, all else being equal, would increase the amount of compressive force exerted in a given arrangement. There is a limit to the hardness of rubber which could be used, else problems with compressing the annulus into the cup would result. Conversely, decreasing the hardness of the rubber of the annulus would decrease the amount of compressive force exerted. It is felt that it might be possible to vary the durometer hardness of the rubber of the annulus of the above-disclosed embodiment anywhere from between about 55 to 80.

The compressive force exerted could be varied by altering the degree of compression of the annulus of an assembled fastener through variation in dimensions of the annulus or through variation in dimensions of the cup cavity. For example, increasing the overall height of the annulus, all else being equal, would increase the compressive force exerted in a given arrangement. For most applications, in order to achieve the typically required sorts of compressive forces through the resilience of the annulus, the overall resting height (H) of the uncompressed annulus would exceed the average difference between the outer and inner diameter of the annulus (OD−ID). That is, the ratio of H/(OD−ID) would generally exceed unity. In the illustrated embodiment, H/(OD−ID) equals about 1.8 (0.6″/[0.5872″−0.25″]).

Decreasing the depth of the cavity into which the annulus is forced would increase the compressive force exerted by the annulus of an assembled fastener, all else being equal.

There are of course variations to the general shape of the annulus and cup cavity that could be inconsequential to the performance of the assembly although, if complete tightening of a fastener is to be indicated by abutment of the cup rim with a member against which it is forced by the turning of a nut, as in the preferred embodiment, the relative size and shape of these elements must be such that the annulus is not squeezed radially outwardly during compression into a position where it interferes with such abutment. The rim of the rigid cup of the illustrated embodiment is a ring lying in the plane of a circle. It would, of course, be possible for the rim to be crenellated or to be otherwise uneven, in which case the gasket would not be entirely enclosed when the rim of the cup is in abutment with a flat surface of a fastening arrangement.

What is claimed is:

1. A washer assembly combination for use with a nut and bolt, or the like, in a fastening arrangement in which a free end of the bolt shaft is received through an aperture of a member to be fastened between the nut and bolt head, the combination comprising:

a cup having an aperture in a bottom end thereof; and
a resilient annulus, wider at one axial end than the other, for receipt in the cup and having an axial aperture located to register with the aperture of the cup when received therein, the apertures sized for receipt of the bolt shaft therethrough; and wherein the annulus and cup are shaped to provide a gap between the annulus and an interior wall of the cup and the annulus is sized to extend beyond a rim of the cup when received therein such that the annulus and cup may be assembled onto the free end of the bolt shaft with the annulus in abutment against the member, and the nut threaded onto the bolt to abut an outer side of the bottom end of the cup to sandwich the cup, annulus and member between the nut and bolt head and to compress the annulus against the member and into the gap such that when the rim of the cup comes into contact with the member, a predetermined pressure is exerted by the compressed annulus on the member.

2. The combination of claim 1, the cup defining a cavity for said receipt of the annulus, wherein the diameter of an upper end of the cavity is greater than the diameter of the cavity at the bottom end of the cup.

3. The combination of claim 2 wherein the cavity is frustoconically shaped.

4. The combination of claim 1 wherein the annulus is frustoconically shaped.

5. The combination of claim 3 wherein the annulus has a first axial end for abutment against the bottom of the cavity, the maximum diameter of the first axial end being less than or equal to the diameter of the bottom of the cavity.

6. The combination of claim 3 wherein the annulus is frustoconically shaped, having a first axial end wider than a second axial end, the first end having a diameter substantially equal to or less than the diameter of the bottom the cavity.

7. The combination of claim 1 wherein the cup is of rigid metal.

8. The combination of claim 1 wherein the annulus is a polymer of ethylene propylene diene monomer.

9. The combination of claim 1 wherein the annulus has a durometer hardness of between about 55 and about 80.

10. The combination of claim 9 wherein the annulus has a durometer hardness of about 55.

11. The combination of claim 1 wherein the axial height of the annulus when in an uncompressed state exceeds the average difference between the outer and inner diameters of the annulus.

12. A washer assembly combination for use with a nut and bolt, or the like, in a fastening arrangement in which a free end of the bolt shaft is received through an aperture of a member to be fastened between the nut and bolt head, the combination comprising:

a frustoconically shaped cup having an aperture in a bottom end thereof; and a resilient frustoconically shaped annulus for receipt in the cup with a wider end of the annulus in abutment with the bottom end of the cup and having an axial aperture located to register with the aperture of the cup when so received therein, the registering apertures sized for receipt of the bolt shaft therethrough; and wherein the annulus is sized such that a narrow end thereof extends beyond a rim of the cup when the annulus is so received therein such that the annulus and cup may be assembled onto the free end of the bolt shaft with the narrow end of the annulus in abutment against the member, and the nut threaded onto the bolt to abut an outer side of the bottom end of the cup to sandwich the cup, annulus and member between the nut and bolt head and to compress the annulus against the member and the narrow end of the annulus into the cavity such that when the rim of the cup comes into contact with the member, a pre-determined pressure is exerted by the compressed annulus on the member.

13. A system for sealing against the ingress of water between first and second layers of material, the system comprising:

a said first layer of material, the material being relatively rigid and having a surface for abutting a said second layer of material, the second layer being relatively flexible and having an aperture therethrough;

a threaded longitudinal fastening member having a free end extending beyond the surface for assembled insertion through the aperture of the second layer and fixed against axial movement in a direction from the first layer toward the second layer;

a clamping member for abutment with the assembled second layer and having an aperture for assembled receipt therethrough of the free end of the fastening member;

a resilient annular member having an aperture for assembled receipt therethrough of the fastening member with the annular member in abutment against the clamping member;

a cup having a cavity open at a first end and having an aperture in an opposite second end for assembly on the free end of the threaded fastening member with the annular member received in the cavity; and a nut for threading onto the free end of the fastening member; and wherein:

the uncompressed length of the annular member exceeds the depth of the cavity such that as the nut is rotated to force the cup axially toward the clamping member, the annular member is compressed between the nut and clamping member into the cavity of the cup, and the annular member is dimensioned such that when the rim of the cup comes into contact with the clamping member the annular member exerts a predetermined pressure on the clamping member so as to compress the first and second layers together to preclude entry of water between the first and second layers.

14. The system of claim 13 wherein the cavity of the cup and the annulus are shaped to provide a gap between the annulus and an interior wall of the cup.

15. The system of claim 14 wherein the first member comprises a skirt of a roof device.

16. The system of claim 15 wherein the clamping member is a clamping ring.

17. The system of claim 16 wherein the diameter of the first end of the cavity is greater than the diameter of the cavity at the second end of the cup.

18. The system of claim 17 wherein the cavity is frustoconically shaped.

19. The system of claim 18 wherein the annulus is wider at one axial end than the other.

20. The system of claim 19 wherein the annulus is frustoconically shaped.

21. The system of claim 20 wherein the annulus has a first axial end for abutment against a bottom of the cavity at the second end of the cup, the maximum diameter of the first axial end of the annulus being less than or equal to the diameter of the bottom of the cavity.

22. The system of claim 20 wherein the annulus is frustoconically shaped, having a first axial end wider than a second axial end, the first end having a diameter substantially equal to or less than the diameter of a bottom of the cavity at the second end of the cup.

23. The system of claim 22 wherein the cup is of rigid metal.

24. The system of claim 23 wherein the annulus is a polymer of ethylene propylene diene monomer.

25. The system of claim 24 wherein the annulus has a durometer hardness of between about 55 and about 80.

26. The system of claim 25 wherein the annulus has a durometer hardness of about 55.

27. The system of claim 26 wherein the axial height of the annulus when in an uncompressed state exceeds the average difference between the outer and inner diameters of the annulus.

28. The system of claim 27 wherein the first layer is of metal.

29. The system of claim 28 wherein the diameter of the free end of the threaded member is between about ⅛ and ½ inches.

30. A washer assembly combination for use with a nut and bolt, or the like, in a fastening arrangement in which a free end of the bolt shaft is received through an aperture of a member to be fastened between the nut and bolt head, the combination comprising:

a cup having an aperture in a bottom end thereof; and a resilient annulus for receipt in the cup and having an axial aperture located to register with the aperture of the cup when received therein, the apertures sized for receipt of the bolt shaft therethrough, the axial height of the annulus when in an uncompressed state exceeding the average difference between the outer and inner diameters of the annulus; and wherein the annulus and cup are shaped to provide a gap between the annulus and an interior wall of the cup and the annulus is sized to extend beyond a rim of the cup when received therein such that the annulus and cup may be assembled onto the free end of the bolt shaft with the annulus in abutment against the member, and the nut threaded onto the bolt to abut an outer side of the bottom end of the cup to sandwich the cup, annulus and member between the nut and bolt head and to compress the annulus against the member and into the gap such that when the rim of the cup comes into contact with the member, a predetermined pressure is exerted by the compressed annulus on the member.

* * * * *